Nov. 5, 1929.                    W. M. BRADSHAW                    1,734,199
                                  DAMPING SYSTEM
                                Filed Dec. 24, 1927
Fig. 1.
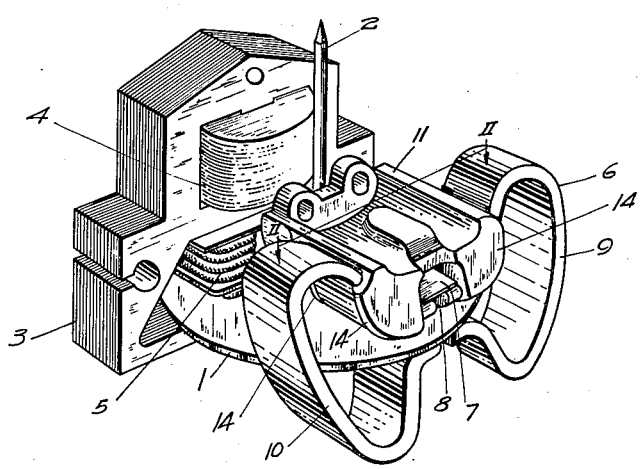
Fig. 2.    Fig. 5.    Fig. 3.
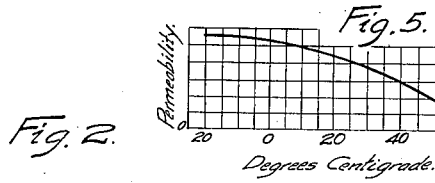
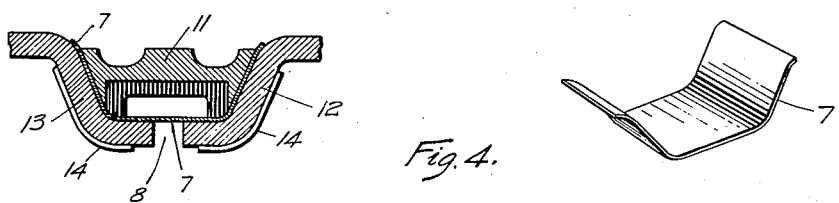
Fig. 4.
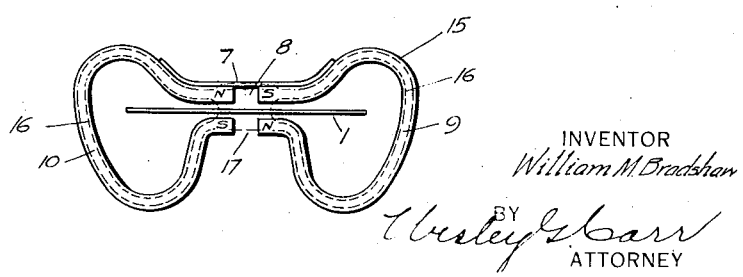
INVENTOR
William M. Bradshaw
BY
ATTORNEY Patented Nov. 5, 1929

1,734,199

UNITED STATES PATENT OFFICE

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA

DAMPING SYSTEM

Application filed December 24, 1927. Serial No. 242,488.

My invention relates to damping systems, and more particularly to damping systems for braking the rotation of a watthour-meter disc.

My invention has for an object to provide means intimately associated with the damping system of a meter for compensating the operation of the latter for variations in temperature that have heretofore been the cause of inaccuracy in such meters.

My invention is applicable to a meter of any type or to a relay wherein permanent magnet damping is used for retarding the action of a turning member, and, therefore, while I have shown and described my improved damping system as embodied in an induction watthour meter, I do not wish to be so limited.

In an induction watthour meter and similar instruments the sources of temperature errors may be divided into two groups, i.e. the non-inductive source and the inductive source.

The non-inductive source causes the actual calibration of the meter to change with a change in temperature. This change in the actual calibration of the meter may be subdivided into two parts. In the first place, with a rising temperature, the permanent damping magnets lose some of their strength, i. e. the flux across their air gaps decreases as the temperature of the magnets increases. Since the speed of the meter is greatly dependent upon the value of this flux, the two varying in an inverse direction, upon an increase of temperature, the speed of the meter increases. In the second place, because of the inherent characteristics of the iron in the electromagnet, upon an increase in temperature, the actual torque of the meter is slightly increased, whereby the speed of the meter increases. The combination of these two factors produce the main non-inductive errors that cause the speed of an induction meter to increase with an increase in temperature.

It is the purpose of my invention to compensate for such non-inductive errors in a watthour meter and, to this end, I provide a damping system that is so responsive to temperature variations that a watthour meter is caused to operate substantially in the same manner as if it were operating free from temperature variations.

My invention may, however, be more readily understood if the accompanying drawings are referred to in connection with the following description.

In the drawings;

Figure 1 is a simplified perspective view of the driving and damping systems of an induction watthour meter, Fig. 2 is a view, in section, taken on the line 11—11 of the damping system shown in Fig. 1, Fig. 3 is a perspective view of the temperature-responsive shunt, Fig. 4 is a schematic diagram of a damping system constructed in accordance with my invention, and Fig. 5 is a characteristic curve of the material comprising the shunt member shown in Fig. 3, showing the way in which the permeability of said material varies with temperature.

Referring to Fig. 1, a watthour-meter disc 1 is mounted on a shaft 2. The disc 1 is of a conducting material, such as copper or aluminum, and is driven by cooperating fluxes produced in a laminated magnetizable core 3 from a voltage winding 4 and current windings 5, mounted thereon. The rotation of the disc 1 is damped by a damping system 6 constructed in accordance with my invention, the component elements of which will be more fully set forth hereinafter.

The shaft 2 is connected to, and drives, an integrating dial train, not shown, in the usual and well known manner. The voltage coil 4 is connected in parallel and the current coils 5 are connected in series-circuit relation to an electrical circuit (not shown), the power of which is being measured.

As hereinbefore set forth, if a watthour meter is calibrated to operate correctly at a certain temperature, any variation from that certain temperature will produce an inaccuracy in the operation of the meter. For example, if the temperature increases above that certain temperature, the disc 1 tends to rotate more rapidly and if the temperature decreases from that certain temperature, the disc 1 tends to rotate more slowly.

I compensate meter 1 for temperature errors by means of a magnetizable shunt 7 that is placed in a position bridging the air gap 8 between the north and south-pole portions of the permanent magnets 9 and 10. The end portions of the shunt 7 are disposed between a bracket 11 and side portions 12 and 13 of the permanent magnets 9 and 10.

In a manufacturing operation, the magnets 9 and 10 and the shunt 7 are formed into a unitary structure by means of the bracket 11 that is provided with rims 14 that are folded over, by means of great pressure, around the sides of the portions 12 and 13 of the permanent magnet. The shunt 7, in this operation, is secured permanently in immovable position with respect to the permanent magnets 9 and 10. Such unitary structure of the shunt and permanent magnets is highly desirable in manufacturing large quantities of damping-magnet systems in accordance with a predetermined standard.

The shunt 7 is a strip of magnetizable metal having approximately the following chemical constituents: .18% silicon, 21.63% copper, .86% iron, 3.93% manganese and 73.37% nickel. The temperature-permeability characteristics of an alloy having substantially these chemical constituents is shown in the curve of Fig. 5, in which the permeability of the shunt 7 is plotted against temperature in degrees centigrade. The material comprising the shunt 7 has a pronounced negative coefficient of permeability, that is to say, with an increase in temperature, the permeability of the shunt 7 decreases. This phenomena is utilized in my invention by placing the shunt 7 in the path of a leakage flux of the damping magnets so that, upon a change in temperature, such leakage flux is increased or decreased, as the case may be, with a decrease or increase of temperature, respectively, to change the damping flux traversing the disc 1.

Referring to Fig. 4, a single leakage-flux path 15 is shown. At no point does this leakage flux 15 cut the disc 1. A useful flux path 16 is shown in the permanent magnets 9 and 10 that cuts the disc 1. The flux traversing such path 16 is effective in damping the rotation of the disc 1. Both the leakage flux and the useful flux are produced, however, from the permanent magnets 9 and 10, and it may readily be seen that, when the leakage flux in path 15 is increased or decreased, the useful flux in paths 16 is correspondingly decreased or increased.

The permanent magnets 9 and 10 are placed in such positions that their pole portions are disposed with respect to each other in the manner shown in Fig. 4, that is, the opposite pole portions of each magnet are separated by an air gap in which the disc 1 is disposed, and the pole portions of the different magnets 9 and 10 are separated by air gaps 8 and 17 so that their pole portions of opposite polarity face each other. Such disposition of the pole portions causes a substantial leakage flux to traverse the leakage-flux path 15 and, therefore, any change in the permeability of the shunt 7, upon a change in the temperature, materially affects the useful flux traversing the path 16.

The magnitude of the flux cutting the disc 1 controls the speed of the meter, assuming that it is driven by a given torque. With an increase in temperature, the permeability of the magnetizable material 7 decreases. Such decrease in permeability causes less flux to traverse the path 15, thereby forcing more flux to traverse the path 16 through the disc 1. Such increase in the flux cut by disc 1 tends to slow the latter down, thus compensating it for any tendency to increase in speed with an increase in temperature.

It will, of course, be readily understood that the strip of magnetizable material forming the shunt 7 may be placed either above or below the disc 1 without affecting its operation. Also, instead of being placed between the bracket 11 and permanent magnets 9 and 10, in the process of manufacture, the strip 7 may be so placed above the bracket 11 as to have a similar effect, as hereinbefore explained, on the leakage flux of the permanent magnet.

The shape and disposition of the shunt 7, however, are advantageous from both the manufacturing and the operating standpoints, when arranged in the manner set forth above, in accordance with my invention. The intimate engagement of the bracket 11 with the permanent magnets 9 and 10 effectually retains the strip 7 in proper position and prevents slipping or mis-alignment of the strip 7 with respect to the permanent magnets 9 and 10.

Various changes and modifications may be made in my invention without departing from the spirit and scope thereof, as set forth in the appended claims.

I claim as my invention:

1. In combination, a rotatable disc, means including a plurality of magnets for producing and directing a flux through said disc, means for retaining said magnets in fixed relationship, and means for affecting the magnitude of said flux traversing said disc comprising a strip of magnetizable material clamped between said magnets and said retaining means.

2. A damping system comprising a plurality of permanent magnets, a non-magnetizable bracket securing said magnets in fixed position with respect to each other, and a sheet-like strip of temperature responsive magnetizable metal clamped between said bracket and said magnets.

3. A damping system comprising a plurality of permanent magnets of substantially C-shape, means for securing said magnets together in such manner that the positive pole portion of one magnet is separated from but faces the negative pole portion of the other magnet, and means embraced by said securing means comprising a strip of magnetizable material having a negative temperature coefficient of permeability disposed adjacent opposite pole portions of said magnets for affecting the magnitude of flux in the openings between the pole portions of said magnets upon changes of temperature.

4. In combination, an armature, means including a plurality of magnets for damping said armature, means for retaining said magnets in fixed relationship, and means responsive to temperature changes for affecting the magnitude of said damping including a sheet-like member of magnetizable material clamped between said magnets and said retaining means.

In testimony whereof, I have hereunto subscribed my name this 15th day of December, 1927.

WILLIAM M. BRADSHAW.